(12) United States Patent
Ikuta

(10) Patent No.: US 6,834,819 B2
(45) Date of Patent: Dec. 28, 2004

(54) DUAL-BEARING REEL

(75) Inventor: Takeshi Ikuta, Sakai (JP)

(73) Assignee: Shimano, Inc., Osaka (JP)

( * ) Notice: Subject to any disclaimer, the term of this patent is extended or adjusted under 35 U.S.C. 154(b) by 0 days.

(21) Appl. No.: 09/986,689

(22) Filed: Nov. 9, 2001

(65) Prior Publication Data

US 2002/0060258 A1 May 23, 2002

(30) Foreign Application Priority Data

Nov. 17, 2000 (JP) ........................................ 2000-350892

(51) Int. Cl.$^7$ ............................................. A01K 89/15
(52) U.S. Cl. ........................ 242/323; 242/316; 242/310
(58) Field of Search ................................ 242/316, 323, 242/310, 267, 268; D22/140, 141; 43/22

(56) References Cited

U.S. PATENT DOCUMENTS

| | | | | |
|---|---|---|---|---|
| 121,020 A | * | 11/1871 | Terry | 242/306 |
| 2,993,660 A | * | 7/1961 | Parks | 242/295 |
| 3,166,269 A | * | 1/1965 | Veroli | 242/270 |
| 3,478,979 A | * | 11/1969 | Henze | 242/270 |
| 4,422,600 A | * | 12/1983 | Preston | 242/271 |
| 4,688,346 A | * | 8/1987 | Collins | 43/22 |
| 4,728,052 A | * | 3/1988 | Yeh | 242/313 |
| 4,828,152 A | * | 5/1989 | Pepping | 224/200 |
| 5,150,854 A | * | 9/1992 | Noda | 242/310 |
| 5,615,842 A | * | 4/1997 | Furubayashi | 242/268 |
| D404,792 S | * | 1/1999 | Oh | D22/140 |
| 5,865,388 A | * | 2/1999 | Yeh | 242/292 |
| 5,956,884 A | * | 9/1999 | Goodrich | 43/22 |

* cited by examiner

*Primary Examiner*—Kathy Matecki
*Assistant Examiner*—Evan H Langdon
(74) *Attorney, Agent, or Firm*—Shinjyu Global IP Counselors, LLP

(57) ABSTRACT

Dual-bearing reel, onto which a harness for tying to an angler is attachable, is equipped with a reel body, a rod mount, harness clips, a spool, and a handle. The reel body is coupled to a fishing rod from below such that the reel body is disposed beneath the fishing rod during use. The reel body is furnished with a mounting pod on top that is coupled to the fishing rod. The harness clips are furnished on the rod mount side of the reel body 1, and engage the harness removably and reattachably. The spool is rotatively carried in the reel body. The handle cranks the spool. For dual-bearing reels attachable to a harness for tying to an angler, relieving the burden on the angler when using the harness.

17 Claims, 4 Drawing Sheets

Fig. 1     EXHIBIT A

DUAL-BEARING REEL

BACKGROUND OF THE INVENTION

1. Field of the Invention

This invention generally relates to dual-bearing reels. More specifically, the present invention relates to dual-bearing reels onto which a harness for tying to an angler is attachable.

2. Background Information

Dual-bearing reels are generally equipped with: a reel body that attaches to a fishing rod; a spool rotatively carried in the reel body; a handle assembly for cranking the spool; and a torque-transmitting mechanism that transmits torque from the handle assembly to the spool.

A reel body includes a left-and-right pair of side plates, a plurality of connecting members that connect the pair of side plates, and a pair of side covers covering the outside of the pair of side plates. A mounting pod that fits onto a fishing rod is attached to the connecting member furnished at the bottom of the side plate pair. Further, in big-game dual-bearing reels, harness lugs, to which the harness for tying the reel body to an angler is removably and reattachably attachable, are installed on the connecting member furnished at the top of the reel body.

Reels equipped with harness lugs in this way let the weight of the fishing rod and reel be borne with a belt harness across the angler's neck, shoulders, and waist. This lightens the burden on the arms when grappling with big-game fish, or deep-jigging (casting jigs in the 300 g to 500 g range to depths of 100 m or more, and winding up the jig while repeating a jerking action).

Since the mounting pod that fits onto a fishing rod is furnished at the bottom of the pair of side plates on the reel body of the dual-bearing reel, the reel body is necessarily positioned on the upper surface of the fishing rod. At the same time, the harness is attached to the upper portion of the reel body as described above. Under these circumstances, particularly with lever-drag reels like heavyweight trolling reels, the angler has to bear against the moment of the fishing rod, which tends to rotate about the axis of the fishing rod due to the weight of the reel itself. In the aforementioned big-game grappling and deep-jigging situations, because the direction of the moment frequently changes, increasing burden is caused on the neck, shoulders and waist of the angler on whom the harness is hung.

In view of the above, there exists a need for a reel which overcomes the above mentioned problems in the prior art. This invention addresses this need in the prior art as well as other needs, which will become apparent to those skilled in the art from this disclosure.

SUMMARY OF THE INVENTION

An object of the invention is to provide a dual-bearing reel that is attachable to a harness for tying to an angler, and relieves the burden on the angler who uses the harness.

A dual-bearing reel is a reel onto which a harness for tying to an angler is attachable, and is equipped with a reel body, a rod mount, harness clips, a spool, and a handle. The rod mount is furnished with a mounting pod that is disposed on top of the reel body and fitted onto the fishing rod, such that the reel body is disposed under the fishing rod during use. The harness clips are furnished on the rod mount side of the reel body for engaging the harness removably and reattachably. The handle cranks the spool.

Where the mounting pod is furnished on the upper part of the reel body of this dual-bearing reel, under-handling in which the reel body is disposed beneath the fishing rod during use, can be achieved. When the angler is actually fishing, the forward end of the belt-shaped harness passed across the angler's neck, shoulders and waist is locked into the harness clips. The harness clips are moreover furnished on the mounting-pod end. Herein, since the reel body is disposed beneath the fishing rod, the reel's center of gravity is positioned beneath the fishing rod. Therefore the reel is stable during the actual fishing. Accordingly, fishing-rod twisting moment is less likely to be produced, and the variation in moment direction will be slight. Nevertheless, because the harness clips are furnished on the mounting-pod side of the reel body, which is closer to the fishing rod, while the harness is locked into the harness clips during the fishing, force produced by the moment is less likely to act on the harness. This relieves the burden on the angler.

Preferably, the harness clips of the dual-bearing reel are provided on both ends of the reel body in the rotational axis orientation of the spool. In this case, by furnishing the harness clips on both ends of the reel body in the rotational axis orientation of the spool, the harness can be locked securely. At the same time, the reel body is unlikely to lean left or right relative to the spool rotational axis orientation with respect to the turning moment of the fishing rod.

Preferably, the harness clips of the dual-bearing reel are installed on the reel body, via a member that is separate from the reel body. In this case, the harness clips may for example be constituted from a material component different from that of the reel body.

Preferably, the mounting pod of the dual-bearing reel is attachable to and removable from the reel body. In this case, the mounting pod can be fitted not only to the upper part of the reel body, but also to the lower part.

Preferably, the mounting pod of the dual-bearing reel is also attachable to the bottom of the reel body. In this case, an under-handling reel can be achieved when the mounting pod is fitted to the upper part of the reel body, while an over-handling reel can be achieved when the mounting pod is fitted to the lower part of the reel body. In other words the same reel can be utilized either as an over-handling reel or an under-handling reel.

These and other objects, features, aspects and advantages of the present invention will become apparent to those skilled in the art from the following detailed description, which taken in conjunction with the annexed drawings, discloses a preferred embodiment of the present invention.

BRIEF DESCRIPTION OF THE DRAWINGS

Referring now to the attached drawings which form a part of this original disclosure.

DETAILED DESCRIPTION OF THE PREFERRED EMBODIMENTS

Figure 1:
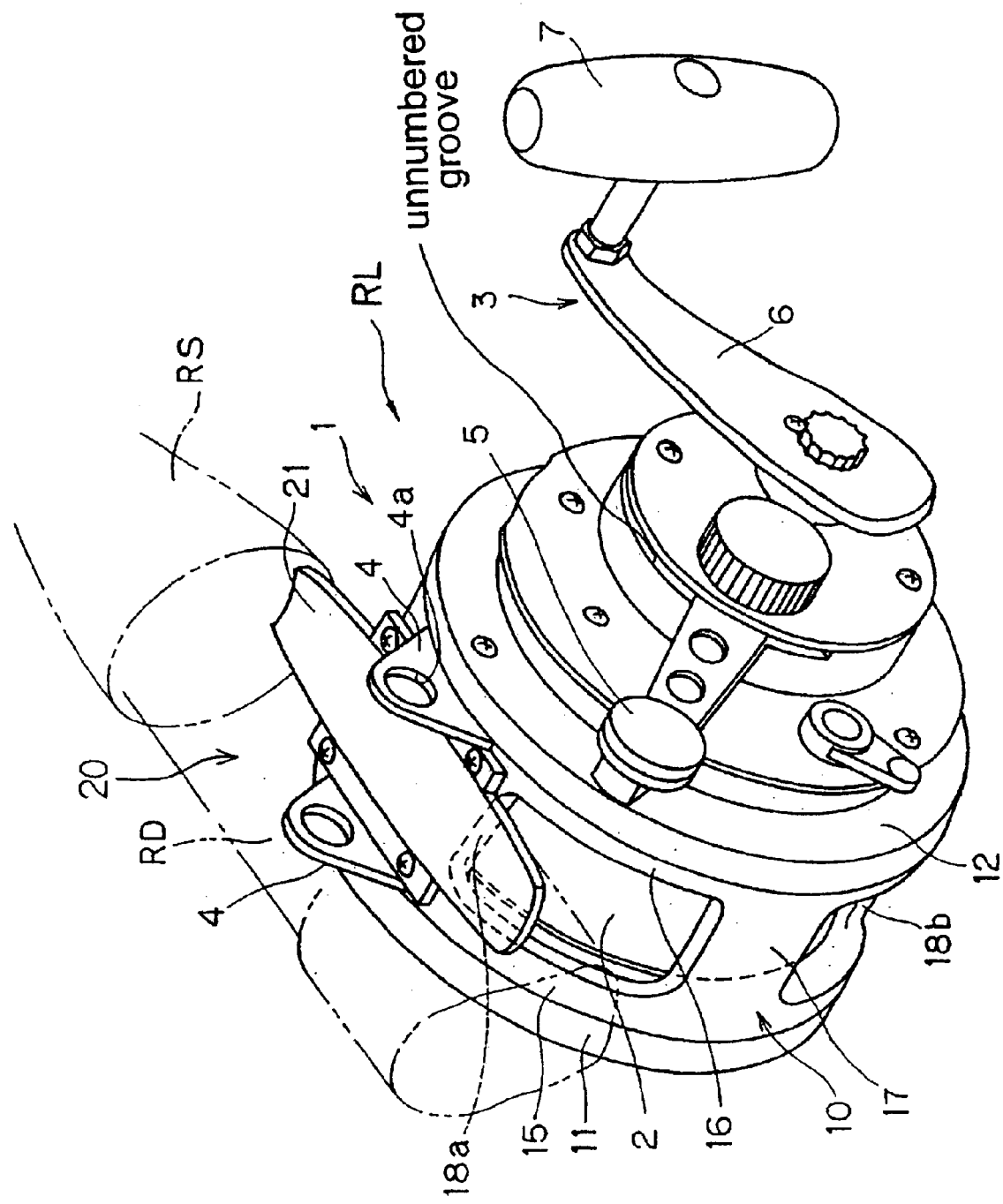
FIG. 1 is a perspective view of a dual-bearing reel according to the first embodiment of the present invention.
Figure 2:
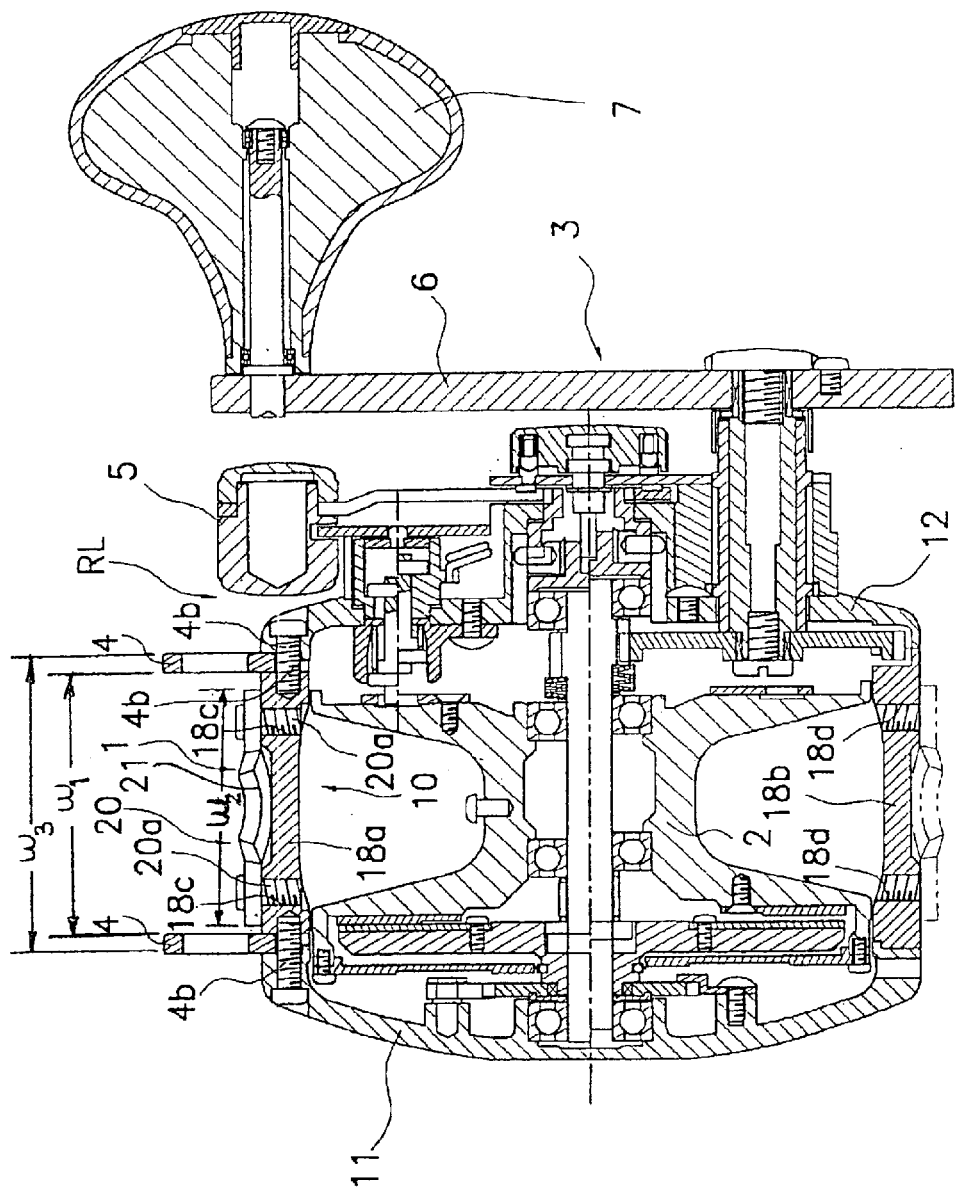
FIG. 2 is a sectional view of a dual-bearing reel according to the first embodiment of the present invention.
Figure 3:
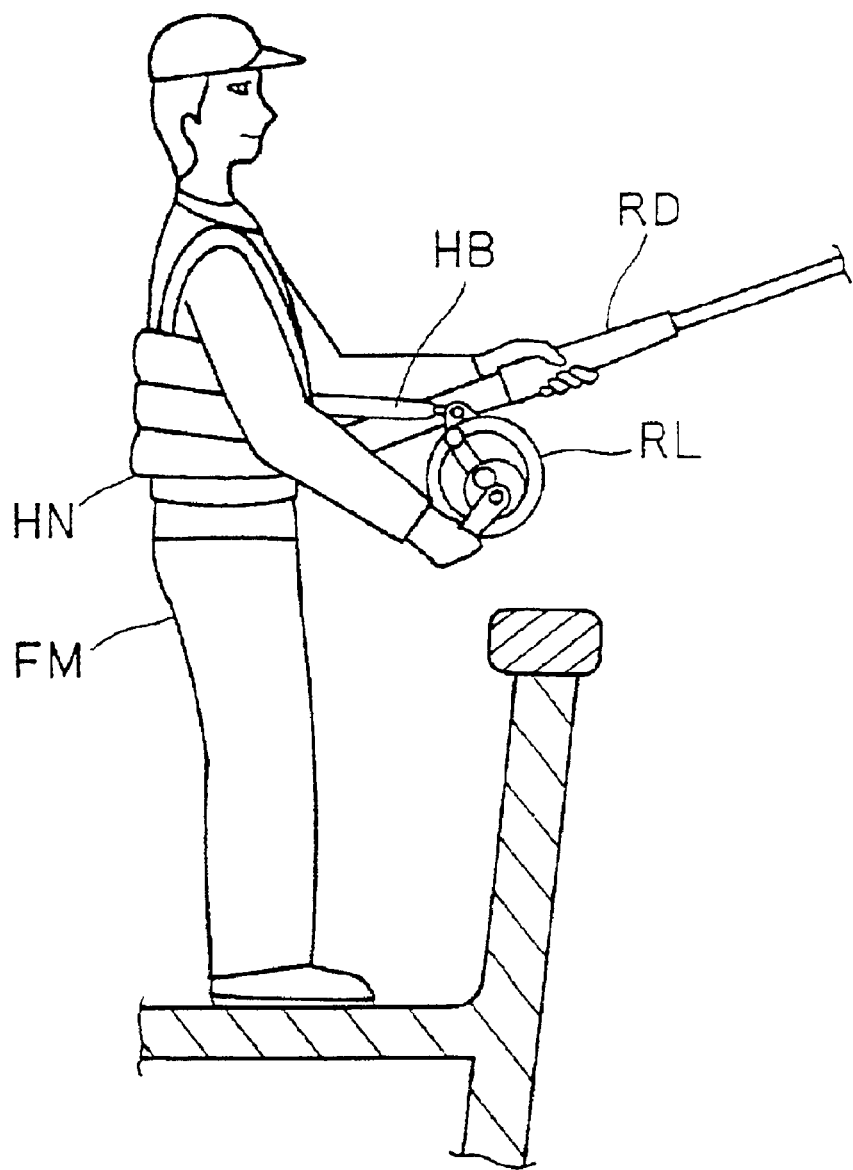
FIG. 3 is a schematic diagram illustrating use of the dual-bearing reel according to the first embodiment of the present invention.

As seen in FIGS. 1–3, a dual-bearing reel RL in accordance with a first embodiment of the present invention is a round lever-drag reel for jigging. The reel is circular when viewed laterally. The dual-bearing reel RL is equipped with: a reel body 1 that is coupled to a fishing rod RD from below; a line-winding spool 2 rotatively carried in the reel body 1; a handle 3 by which the spool 2 is cranked; a rod mount 20 (rod mounting means) for attaching the fishing rod RD; and a left-right pair of harness clips 4 (harness connector or harness connecting means) provided on an upper side of the reel body 1. A harness HN, which ties an angler FM to the reel body 1, is removably and reattachably engageable to the harness clips 4.

The reel body 1 includes a reel frame 10 and first and second side covers 11 and 12 disposed on each side of the reel frame 10. The reel frame 10 includes: round first and second side plates 15 and 16 disposed at a spacing in the rotational axis orientation of the spool 2; front and rear connectors 17 (connector on the front end not illustrated) connecting the two side plates 15, 16; and top and bottom connectors 18a, 18b. Each of these parts is formed unitarily out of a metal.

The top and bottom connectors 18a, 18b have threaded holes 18c, 18d (rod mount coupling portions, rod mount coupling means) formed thereon. The top connector 18a is wider than the front and rear connectors 17, and there the rod mount 20 is removably and reattachably coupled to the top connector 18a by fastening coupling members such as bolts 20a to the holes 18c. The rod mount 20 includes a mounting pod 21 onto which fits reel seat RS of the fishing rod RD. The mounting pod 21 is a plate-shaped component extending front to rear, whose upper surface is curved into a concavity contoured to follow the reel seat RS. The holes 18d that enable attachment of the mounting pod 21 are formed in the underside connector 18b. Accordingly, the mounting pod 21 is also installable on the underside connector 18b. Therefore, the dual-bearing reel RL can be used as an under-handling reel when disposed beneath the fishing rod RD, and can also be used as an over-handling reel when disposed atop.

The spool 2, disposed between the two side plates 15 and 16, is a bobbin form having flanges at either end. The spool 2 is rotatively carried by the first and second side covers 11 and 12 on the reel body, and is connected to the handle 3 via a torque-transmission mechanism not illustrated herein. The torque-transmission mechanism includes a lever-drag mechanism not illustrated herein. By setting the drag force with the lever-drag mechanism, the torque-transmission mechanism is put into a state in which the torque-transmission mechanism is connected to transmit the rotation, and also rotation in the line reel-out direction is prevented. Further, by releasing the drag force through the lever-drag mechanism, a free-rotating state is achieved, whereby any rotations including rotations in the line reel-out direction are allowed. A drag lever 5 is pivotally fitted to the second side cover 12 and extends toward the side of the reel body on which the mounting pod 21 is provided, as shown in FIG. 1. The drag lever 5 sets the drag force of the lever-drag mechanism.

The handle 3 includes crank arm 6 and handle grip 7 fitted rotatively to the tip of the crank arm 6. The outer peripheral surface of the handle grip 7 is a slightly bowed, rounded smooth T-shape that facilitates a powering grasp.

The pair of harness clips 4 is furnished on the mounting-pod 21 side of the reel body 1. Specifically, the harness clips 4 are removably and reattachably installed by bolts 4b on the outside surfaces of the first and second side plates 15, 16 respectively, in the upper-end area of the reel frame 10. The harness clips 4 are roughly hill-shaped components made of a metal such as a stainless-steel alloy. The harness clips 4 are fitted to the first and second side plates 15, 16 by, e.g., bolts. Round attachment-holes 4a, which enable attachment of the harness HN (FIG. 2), are formed in the harness clips 4.

When jigging is performed from a boat with a dual-bearing reel RL thus configured, the dual-bearing reel RL is installed onto the reel seat RS as shown in FIG. 1. Then, the fishing line is drawn out from the tip through a fishing-line guide on the fishing rod RD, which is not illustrated in the FIGS. Terminal tackle such as a jig is attached to the end of the drawn-out fishing line. In this state, the harness HN is fitted to the waist, and the harness braces HB on the harness HN are locked into the harness clips 4, as shown in FIG. 3. Further, gimbals, which are not illustrated in the FIGS., are fitted to the waist, so as to receive the butt of the fishing rod. The dual-bearing reel RL and the fishing rod RD are thereby firmly supported by the angler FM.

With the harness HN fitted in place, the lever-drag mechanism is put into the drag-release state using the drag lever 5, and the jig is dropped from the edge of the boat deep into the sea. When the jig has dropped down to the ocean floor, deep-jigging is performed by setting the drag force through the drag lever 5 and repeating the winding-in operation and jerking movements. In this circumstance, because the dual-bearing reel RL is employed underneath the fishing rod RD, turning moment about the fishing rod RD is not likely to occur. Further, since the harness clips 4 are furnished on the mounting-pod 21 side, which is closer to the fishing rod RD, when the harness HN is locked into the harness clips 4 during fishing, force arising due to the moment is not likely to act on the harness HN. This therefore relieves the load on the angler.

Figure 4:
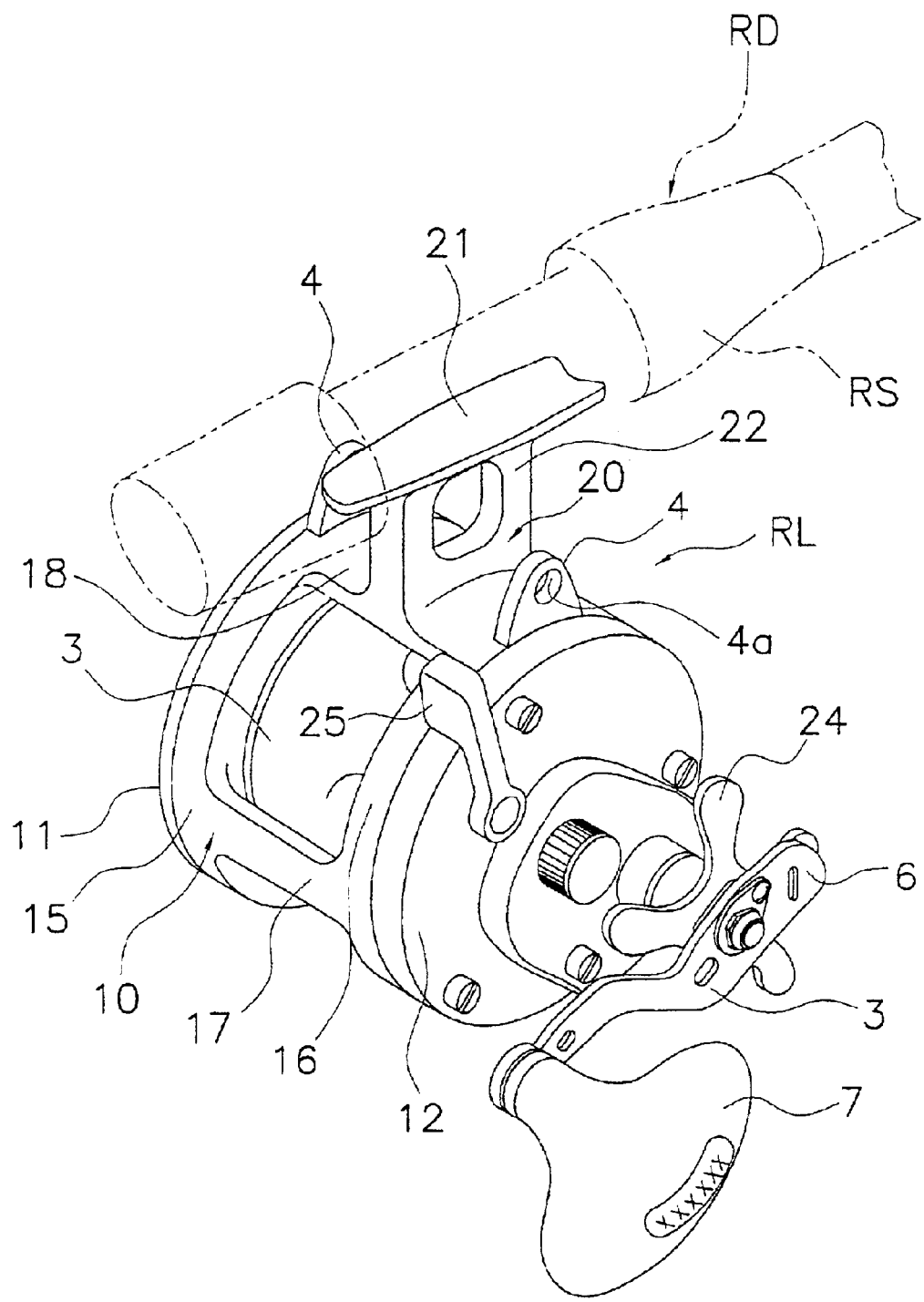
FIG. 4 is a perspective view of a dual-bearing reel according to the second embodiment of the present invention.

Other Embodiments (a) In the foregoing embodiment, the mounting pod 21 is fitted directly to the rod mount 20. As shown in FIG. 4, the mounting pod 21 and the connector 18 on the top of the reel frame 10 may be separated by an interval.

The rod mount 20 in FIG. 4 extends upward from the connector 18. The rod mount 20 includes a mounting pod 21 that fits onto the reel seat RS of the fishing rod RD, and vertically extensive legs 22 joining the mounting pod 21 and the connector 18. The mounting pod 21 is a plate-shaped component extending front to rear, whose upper surface is curved into a concavity contoured to follow the reel seat RS. The mounting pod 21 can be formed unitarily with or as a separate piece from the legs 22. Each of the legs 22 is pillar-shaped, and connects the mounting pod 21 and the connector 18 very rigidly. By providing a vertically extensive leg 22 like this, the fishing rod RD and the reel frame 10 can have a distance therebetween, which allows the fishing rod to be gripped even where the dual-bearing reel RL is attached. Also, it is possible to provide a space between the fishing rod RD and the fishing line that is guided from the dual-bearing reel RL to the fishing rod RD.

(b) The foregoing embodiment utilizes a round, lever-drag dual-bearing reel. However, the present invention can also be applied to a star-drag dual-bearing reel such as the one shown in FIG. 3, or to an odd-shaped dual-bearing reel that is not round. Here, for star-drag dual-bearing reel applications, a drag,-regulating star drag 24 and a clutch lever 25 for clutching on/off are furnished on the reel body 1.

Effects of Invention

Under the present invention, since the reel body is disposed beneath the fishing rod, the center of gravity of the reel is located below the fishing rod, thereby stabilizing the reel. Also, fishing-rod twisting moment is not likely to be produced during actual fishing. Accordingly, variation in moment direction will be slight. Furthermore, because the harness clips are furnished on the rod mount side of the reel body, which is closer to the fishing rod, when actually fishing, while the harness is locked into the harness clips, force produced by the moment is not likely to act on the harness. This relieves the burden on the angler.

What is claimed is:

1. A dual-bearing reel onto which a harness for tying to an angler is attachable, said dual-bearing reel comprising:
   a reel body;
   a rod mount for being coupled to a fishing rod, said rod mount being attached to said reel body;
   a harness connector that removably and reattachably engages the harness, said harness connector being provided on a side of said reel body on which said rod mount is mounted;
   a drag lever pivotally fitted to said reel body for adjusting a drag force of said spool, said drag lever extending toward the side of said reel body on which said rod mount is mounted;
   a spool rotatively carried in said reel body; and
   a handle that cranks said spool.

2. The dual-bearing reel set forth in claim 1, wherein said harness clips are installed on said reel body with a coupling member.

3. The dual-bearing reel set forth in claim 1, wherein said rod mount is removably and reattachably coupled to said reel body.

4. The dual-bearing reel set forth in claim 1, wherein said rod mount has a mounting pod for being coupled to the fishing rod.

5. The dual-bearing reel set forth in claim 1, wherein said rod mount is attachable to an upper side of said reel body, such that said reel is disposed below the fishing rod when said reel is coupled to the fishing rod.

6. The dual-bearing reel set forth in claim 4, wherein said mounting pod is a plate-shaped component whose surface is curved into a concavity such that said surface fits the fishing rod.

7. The dual-bearing reel set forth in claim 1, wherein said reel body has first and second side plates and top and bottom connectors connecting said two side plates, said first and second side plates being disposed at a spacing in a direction of a rotational axis of said spool, and said rod mount is removably and reattachably coupled to said top connector.

8. The dual-bearing reel set forth in claim 4, wherein said rod mount further includes a leg portion joining said mounting pod and said reel body.

9. The dual-bearing reel set forth in claim 8, wherein said mounting pod is formed unitarily with said leg portion.

10. The dual-bearing reel set forth in claim 8, wherein said leg portion includes a pair of pillar shaped members that extend vertically from said reel body.

11. A dual-bearing reel onto which a harness for tying to an angler is attachable, said dual-bearing reel comprising:
    a reel body having rod mount coupling portions on upper and lower sides of said reel body;
    a rod mount for being coupled to a fishing rod, said rod mount being attached to said reel body;
    a harness connector that removably and reattachably engages the harness, said harness connector being provided on a side of said reel body on which said rod mount is mounted;
    a spool rotatively carried in said reel body; and
    a handle that cranks said spool.

12. The dual-bearing reel set forth in claim 11, wherein said rod mount coupling portions are holes.

13. A dual-bearing reel onto which a harness for tying to an angler is attachable, said dual-bearing reel comprising:
    a reel body;
    rod mounting means attached to said reel body for coupling to a fishing rod;
    harness connecting means including first and second harness clips for removably and reattachably engaging the harness, said harness connecting means being provided on a side of said reel body on which said rod mounting means is coupled;
    drag lever means pivotally fitted to said reel body for adjusting a drag force of said spool, said drag lever extending toward the side of said reel body on which said rod mounting means is provided;
    a spool rotatively carried in said reel body; and
    a handle that cranks said spool.

14. The dual-bearing reel set forth in claim 13, wherein said rod mounting means is adapted to be coupled to the fishing rod from below such that said reel is disposed below the fishing rod.

15. The dual-bearing reel set forth in claim 13, wherein said reel body has rod mount coupling means for coupling said rod mounting means to said reel body removably and reattachably.

16. The dual-bearing reel set forth in claim 1, wherein said harness connector has first and second harness clips that removably and reattachably engage the harness, said first and second harness clips are coupled to said reel body, said first and second harness clips have first and second inner surfaces, respectively, and a first transverse width that extends between said first and second inner surfaces;
    said rod mount has a second maximum transverse width that is measured substantially perpendicular to a longitudinal axis of said rod mount; and
    said reel body has a one-piece reel frame and separate first and second side covers coupled to said one-piece reel frame, said first and second side covers have third and fourth inner surfaces and a third transverse width that extends between said third and fourth inner surfaces, said first transverse width is greater than said second maximum transverse width and less than said third transverse width.

17. The dual-bearing reel set forth in claim 13, wherein said harness connector has first and second harness clips that removably and reattachably engage the harness,
    said first and second harness clips are coupled to said reel body, said first and second harness clips have first and second inner surfaces, respectively, and a first transverse width that extends between said first and second inner surfaces;
    said rod mounting means has a second maximum transverse width that is measured substantially perpendicular to a longitudinal axis of said rod mounting means; and
    said reel body has a one-piece reel frame and separate first and second side covers coupled to said one-piece reel frame, said first and second side covers have third and fourth inner surfaces and a third transverse width that extends between said third and fourth inner surfaces, said first transverse width is greater than said second maximum transverse width and less than said third transverse width.

* * * * *